J. L. NIX.
PROCESS OF ARTIFICIAL INCUBATION.
APPLICATION FILED DEC. 30, 1907. RENEWED JUNE 21, 1909.

1,049,519.

Patented Jan. 7, 1913.

Witnesses
W. C. Stein.
L. A. L. McIntyre

Inventor.
James L. Nix
by Hopkins & Ecirls Attys.

COLUMBIA PLANOGRAPH CO., WASHINGTON, D. C.

UNITED STATES PATENT OFFICE.

JAMES L. NIX, OF HOMER CITY, PENNSYLVANIA.

PROCESS OF ARTIFICIAL INCUBATION.

1,049,519. Specification of Letters Patent. Patented Jan. 7, 1913.

Application filed December 30, 1907, Serial No. 408,621. Renewed June 21, 1909. Serial No. 503,422.

*To all whom it may concern:*

Be it known that I, JAMES L. NIX, a citizen of the United States, and resident of Homer City, Pennsylvania, have invented certain new and useful Improvements in Processes of Artificial Incubation, of which the following is a specification.

My invention relates to an improved process of artificial incubation, and has for its object to provide the incubation chamber of an incubator with air contents of substantially the same chemical constituents as are found in the air under the hen in natural incubation.

Figure 1:
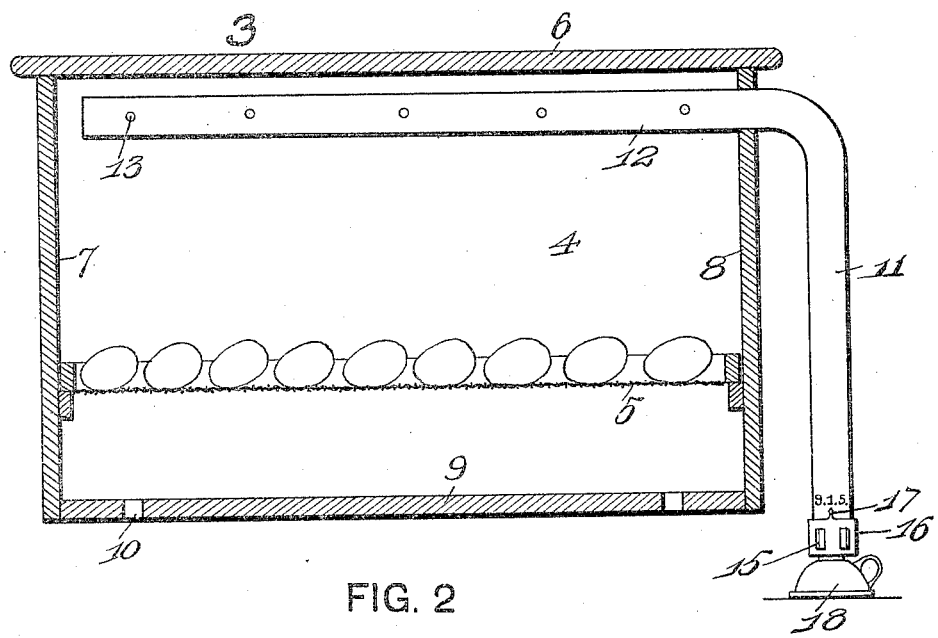
Figure 2:
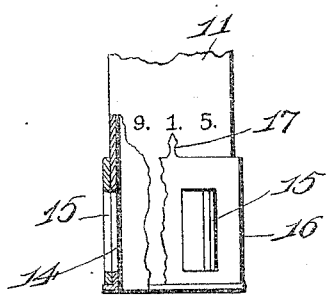

In the drawing, Figure 1 is a transverse vertical view in mid-section of an incubator embodying my invention. Fig. 2 is an enlarged plan view of the lower portion of the heat-and-ventilation pipe, showing the means for predetermining and controlling the admixture of atmospheric air with carbon-dioxid supplied and generated by an alcohol lamp.

In the drawings I have illustrated an incubator 3 whose interior, indicated by the numeral 4, is provided with an egg tray 5. The top of the incubator is indicated by the numeral 6, side walls by the numerals 7 and 8, respectively, and the bottom by the numeral 9, the bottom 9 being provided with perforations 10.

The heat-and-ventilation pipe 11 is mounted in the manner illustrated in the drawings, its upper portion, indicated by the numeral 12, being horizontal and provided with perforations 13. The lower portion of said pipe 11 is provided with openings 14 registering with openings 15 in the collar 16, which collar 16 is revolubly mounted about the lower end of said pipe 11; the collar 16 being provided with the indicator 17 adapted to register with a series of numerals (illustrated as "9.1.5.") upon the outer face of the pipe 11. By revolving the collar 16, the area of the openings 14 is increased or diminished at the will of the operator.

An alcohol lamp 18 is seated within the mouth of the pipe 11, so that the amount of atmospheric air necessary to its combustion and desired for admixture with its fumes, is controlled by the operation of the collar 16. The heat and moisture caused by the burning of the alcohol lamp 18, in admixture with the desired quantity of atmospheric air, forms a constant atmosphere containing carbon-dioxid which is fed to the interior of the incubator through the perforations 13, and which, as it becomes cooled, descends through the perforations 10 in the bottom 9.

It is common in the art of artificial incubation to regulate the temperature of the incubation chamber and to provide the air contents thereof with artificially applied moisture. The result of the employment of these heat regulating and moisture regulating appliances has been embodied in hatches of high percentage, occasionally approximating the percentage attained in natural incubation. But prior to my invention, which is described and claimed herein, artificial incubation has invariably resulted in the production of chicks of lower vitality than those produced by natural incubation; and that impaired vitality is evidenced by the percentage of mortality, as well as the susceptibility of the chicks to white diarrhea or other diseases. Having determined in actual practice that such defective vitality is due to the want of carbon dioxid ($CO_2$), my invention relates to supplying the egg during the process of incubation with carbon dioxid.

In one form of my invention I secure the desired carbon dioxid, together with the desired degree of heat and the desired degree of moisture and the desired ventilation form a single source, to wit, burning alcohol; having determined by experiment that in the consumption of common alcohol ($C_2H_6O$) by burning, the carbon of the alcohol combines with the oxygen in the air and forms carbon dioxid ($CO_2$), while the hydrogen combines with the oxygen of the air and forms water; I have applied these results to the practical purposes of incubation by providing for the direct introduction to the egg chamber of the fumes and moisture generated by the burning of alcohol, to the end of furnishing the interior of the incubating chamber with moisture, heat, ventilation and carbon dioxid ($CO_2$). This I effect by the use of any of the well known forms of alcohol lamp. The quantity of carbon dioxid ($CO_2$) present under the hen in natural incubation varies from twenty-five (25) to seventy-five (75) parts in ten thousand (10,000) parts of atmospheric air, and to control the generation of carbon dioxid ($CO_2$) in the desired quantity, and within these limits, it is only necessary to combine the products of combustion of the alcohol flame with the desired and necessary bulk of atmospheric air.

By the use of my invention in connection with any of the well known appliances of the prior art, it is possible to reproduce with precision the conditions present in natural incubation. Among the beneficial results incident to the use of my invention, the shell of the egg is rendered soluble, as and to the same extent as in natural incubation, so that its lime contents can be assimilated by the developing embryo. Heretofore in the art it has been common to attempt to render the shell soft or soluble by the mere addition of moisture to the incubation chamber; and the inadequacy of the use only of moisture to accomplish this result being manifest in the defective vitality of the chicks, I have overcome that deficiency of the prior art by my invention.

I am aware that in the prior art certain incubators have existed in which the products of combustion of a hydro-carbon oil flame have been conducted, by accident or otherwise, to the incubating chamber. Such incubators have always been inoperative and absolutely devoid of utility for the reason that the combustion of the flame from any of the hydro-carbon oils produces not only carbon-dioxid, but carbon-monoxid, and the latter is fatal to the embryonic life within the shell.

Having fully described my invention, what I claim as new and desire to have secured to me by the grant of Letters Patent, is:

1. The process of incubation described, which consists in providing in an incubating chamber an atmosphere containing a predetermined amount of carbon-dioxid ($CO_2$), substantially as described.

2. The process of incubation described, which consists in providing in an incubating chamber an atmosphere containing a predetermined amount of carbon-dioxid ($CO_2$) created by commingling the fumes of burning alcohol with atmospheric air, substantially as described.

3. The method of incubation, which consists in presenting an alcoholic flame product in conjunction with air to an egg containing chamber, and establishing and maintaining such atmosphere continuously during the period of development of the eggs in the chamber.

In testimony whereof, I have signed my name to this specification, in presence of two subscribing witnesses.

JAMES L. NIX.

Witnesses:
  HELEN MONTROSE,
  COLGATE SCUDDER.

---

Copies of this patent may be obtained for five cents each, by addressing the "Commissioner of Patents, Washington, D. C."